(12) United States Patent
Zeitler et al.

(10) Patent No.: US 12,391,425 B2
(45) Date of Patent: Aug. 19, 2025

(54) GLASS TUBE FOR PHARMACEUTICAL CONTAINERS AND PROCESS FOR THE PRODUCTION OF A GLASS TUBE

(71) Applicant: SCHOTT AG, Mainz (DE)

(72) Inventors: Jonas Zeitler, Selb (DE); Carsten Hamann, Konnersreuth (DE); Franz Völkl, Friedenfels (DE); Oliver Zettl, Mitterteich (DE); Patrick Braun, Nagel (DE)

(73) Assignee: Schott AG, Mainz (DE)

( * ) Notice: Subject to any disclaimer, the term of this patent is extended or adjusted under 35 U.S.C. 154(b) by 405 days.

(21) Appl. No.: 18/145,817

(22) Filed: Dec. 22, 2022

(65) Prior Publication Data

US 2023/0192350 A1 Jun. 22, 2023

(30) Foreign Application Priority Data

Dec. 22, 2021 (EP) .................................... 21216969

(51) Int. Cl.
*C03C 3/091* (2006.01)
*B65D 1/40* (2006.01)
*C03C 3/078* (2006.01)

(52) U.S. Cl.
CPC ................ *B65D 1/40* (2013.01); *C03C 3/078* (2013.01); *C03C 3/091* (2013.01); *B65D 2575/52* (2013.01)

(58) Field of Classification Search
CPC . B65D 1/40; C03B 17/04; F16L 9/105; B07C 5/342
See application file for complete search history.

(56) References Cited

U.S. PATENT DOCUMENTS

| 2004/0007280 A1 | 1/2004 | Rausch |
| 2004/0129026 A1 | 7/2004 | Bartsch |
| 2021/0284566 A1 | 9/2021 | Sato |

FOREIGN PATENT DOCUMENTS

| DE | 10332176 | 2/2004 |
| DE | 102011013623 | 9/2012 |
| EP | 1369389 | 12/2003 |

OTHER PUBLICATIONS

ASTM E 1829-14, "Standard Guide for Handling Specimens Prior to Surface Analysis", 2014, 5 pages.
(Continued)

*Primary Examiner* — Laura A Auer
(74) *Attorney, Agent, or Firm* — Ruggiero McAllister & McMahon LLC

(57) ABSTRACT

A glass tube for pharmaceutical containers is provided. The tube has an inner surface at an inner diameter, an outer surface with an outer diameter, a first end defining a first closed end, a second end defining a first closed end, a first location 400 mm from the first end, a first intermediate location 15 mm from the first end, and a ventilation hole at a first vicinity. The first vicinity is between the first intermediate location and the first location. The glass tube can have a ratio of an integrated $Na_2F^+$ signal to an integrated $^{30}Si^+$ signal of at least 0.10, where the integrated $Na_2F^+$ signal and the integrated $^{30}Si^+$ signal are integrated over a depth of 100 nm. The glass tube can have a ratio between a fluorescence emission determined at a first vicinity and a fluorescence emission determined at a middle section of at least 0.6.

20 Claims, 7 Drawing Sheets

(56) References Cited

OTHER PUBLICATIONS

ASTM E 2695-09, "2009; Standard Guide for Interpretation of Mass Spectral Data Acquired with Time-of-Flight Secondary Ion Mass Spectroscopy", 12 pages.
ISO 4802-2, "Glassware—Hydrolytic resistance of the interior surfaces of glass containers—Part 2: Determination by flame spectrometry and classification", 2010, 20 pages.

$Na_2F^+$ $Na_3F_2^+$ $Na_4F_3^+$

500 μm

GLASS TUBE FOR PHARMACEUTICAL CONTAINERS AND PROCESS FOR THE PRODUCTION OF A GLASS TUBE

CROSS REFERENCE TO RELATED APPLICATIONS

This application claims benefit under 35 USC § 119 of EP Application 21216969.2 filed Dec. 22, 2021, the entire contents of which are incorporated herein by reference.

BACKGROUND

1. Field of the Invention

The invention relates to a glass tube for pharmaceutical containers and a process for the production of a glass tube.

2. Description of Related Art

Glass tubes for pharmaceutical containers are known and widely encountered in hospitals and doctor's offices. There are high and continuously increasing demands on these glass tubes in order to guarantee the quality and integrity of the pharmaceuticals they contain.

Glass tubes for pharmaceutical containers are typically manufactured from a glass melt which is drawn into a glass tube. During subsequent steps the drawn glass tube is cut into portions which are further processed into e.g., glass vials, glass ampoules, glass cartridges or glass syringes. In some glass tubes a ventilation hole is introduced.

In the art, several problems are known that affect the performance and suitability of the glass tubes for the purpose of being used for pharmaceutical containers.

Glass tubes for pharmaceutical containers are a mass product. Despite their putative simplicity and low cost, high-quality demands are placed on them and need to be ensured during and after manufacture and are thus subject to quality control before sale. In particular, contaminations are not acceptable, as even miniscule amounts of contaminants may have inferior negative effect on the quality of pharmaceutical products.

Glass tubes for pharmaceutical containers are made from glass compositions melting at high temperatures. The reason is that excellent hydrolytic resistance, i.e. one of the fundamental requirements of glass for pharmaceutical containers, is based on glass constituents with very high melting points, e.g., $SiO_2$ and $Al_2O_3$. Hence, during production, high melting temperatures may be necessary to achieve melt viscosities sufficient for homogenization and removal of bubbles from the melt. However, high melting temperatures also put high demands on the material of the melting furnace and refining tank. For example, the dissolution of material from the melting and/or refining furnace into the glass melt should be avoided by all means.

Current production processes already provide for good quality standards. Nevertheless, the rare occurrence of contaminants in glass tubes has been reported, so that their prevention remains a constant focus and issue of attention for manufacturers of pharmaceutical containers.

There remains a need to provide for sufficient and constant product monitoring to ensure the desired high-quality demands. Accordingly, there is a related as well as an independent demand that allows for a low cost, high-throughput and in-process control of the quality of the manufactured glass tubes.

SUMMARY

The above objects are solved by the subject-matter of the subject-matter described here below.

In a first aspect, the invention relates to a glass tube for pharmaceutical containers, the glass tube having an inner surface and an outer surface, the glass tube having an inner diameter $d_i$ and an outer diameter $d_o$, the glass tube having a first end and a second end, the glass tube having a first location, wherein the first location is at a distance of 400 mm from the first end, the glass tube having a first intermediate location, wherein the first intermediate location is at a distance of 15 mm from the first end, wherein the first end is formed into a first closed end, wherein preferably also the second end is formed into a second closed end, wherein a ventilation hole is located within a first vicinity of the first closed end, wherein the first vicinity is between the first intermediate location and the first location, wherein ToF-SIMS signals are measurable on the inner surface in the first vicinity, including an $Na_2F^+$ signal and an $^{30}Si^+$ signal, wherein an area on the inner surface in the first vicinity, having a ratio of an integrated $Na_2F^+$ signal to an integrated $^{30}Si^+$ signal of at least 0.10, is 36 mm$^2$ or less, wherein the $Na_2F^+$ signal and the $^{30}Si^+$ signal are integrated over a depth of 100 nm.

In a second and/or related aspect, the invention relates to a glass tube for pharmaceutical containers, the glass tube having an inner surface and an outer surface, the glass tube having an inner diameter $d_i$ and an outer diameter $d_o$, the glass tube having a first end and a second end, the glass tube having a first location, wherein the first location is at a distance of 400 mm from the first end, the glass tube having a first intermediate location, wherein the first intermediate location is at a distance of 15 mm from the first end, wherein the first end is formed into a first closed end, wherein preferably also the second end is formed into a second closed end, wherein a ventilation hole is located within a first vicinity of the first closed end, wherein the first vicinity is between the first intermediate location and the first location, the glass tube having a length $l_a$ along its longitudinal axis, the glass tube further having a middle section, wherein the middle section extends to a distance of 5 $d_i$ centred around the position of 0.5 $l_a$ along the longitudinal axis, wherein the glass tube has a ratio between the fluorescence emission determined at the first vicinity and the fluorescence emission determined at the middle section of at least 0.6.

The invention thus provides a glass tube for pharmaceutical containers with a ventilation hole which allows high-throughput in-process screening via a fluorescence assay. The glass tubes of this disclosure have an improved fluorescence level as compared to conventional glass tubes. The inventors assume that this improved fluorescence level is due to a reduced level of deposited material on the inner surface of the first vicinity of the glass tube. It appears that the reduced level of contaminants increases the length of a travel path of light of an excitation wavelength within the glass tube wall because the portion of excitation light that is reflected at the inner surface of the glass tube is increased. This reflected portion of excitation light incident upon the glass tube via the outer surface enters the glass tube wall and is reflected at the inner surface so that the light passes through the glass tube wall twice and achieves stronger excitation of fluorescent species. It was found that a certain level of the contamination at the inner surface within the first vicinity appears to reduce the amount of light reflected at the inner surface, thereby reducing the emission of fluorescence from any fluorescent compounds of the glass tube. The glass tubes of this disclosure have reduced contamination at the inner surface of the first vicinity thereby increasing a fluorescence signal, or, phrased differently, reducing the negative impact of any contamination on fluorescence signal intensity. A stronger signal means that smaller amounts of fluorescent components can be detected in a fluorescence assay. It also means that a higher signal-to-noise ratio is achieved which allows for a higher reliability in a high-throughput assay. Thus, glass tubes of this invention allow high-throughput in-process screening via a fluorescence assay. The glass tubes of this invention show a residual fluorescence caused by fluorescent components intentionally present in the glass composition, such as e.g., $Fe_2O_3$, $TiO_2$, $ZrO_2$, $CeO_2$, $As_2O_3$, $K_2O$.

ToF-SIMS (Time-of-Flight Secondary-Ion-Mass-Spectrometry) is a sensitive means to characterise glass surfaces and thereby lends itself to assess the inner surface of glass tubes. The inventors have established conditions and accordingly provided a glass tube for pharmaceutical containers with a ventilation hole, wherein deposited material resulting from manufacturing have been minimised compared to glass tubes known in the art. An integrated $Na_2F^+$ signal to an integrated $^{30}Si^+$ signal serves as a fingerprint and/or an indication of deposited material on the inner glass surface which is characteristic of a glass tube for pharmaceutical containers. The glass tube according to the invention advantageously minimises the area in the vicinity of the first ventilation hole, where a characteristic signal can be detected, and hence for an increased fluorescence signal in the first vicinity.

Fluorescent impurities from the glass melt, for example $ZrO_2$ which may stem from the melting tank during the melting of a batch of glass raw materials, display fluorescence which can be detected in the obtained glass tube. The following phenomenon has been considered to explain why the minimisation of deposited material on the inner glass surface of the glass tube improves fluorescence detection: An excitation light beam can be directed on the outer surface of a glass tube and will be refracted into the glass and totally internally reflected at the glass-air interface towards the inner part of the glass tube. Along its light path inside the glass tube, (residual) fluorescent components will be excited whose fluorescence can be detected orthogonally from the excitation beam. In case the inner surface of the glass tube is affected by deposited material resulting from manufacturing, total internal reflection of the excitation light beam will be frustrated which leads to a loss of excitation light at the glass-air interface and/or a reduction excitation light intensity. This loss in excitation light (intensity) directly correlates with a loss in fluorescence emission which is readily detectable by a fluorescence detector. A suitable fluorescence detector can be integrated into the manufacturing apparatus and serves as a direct way of integrated product control. The absence of deposited material in the first vicinity can be confirmed by ToF-SIMS measurement and/or by comparing the residual fluorescence of the middle section of the glass tube with the residual fluorescence in the first vicinity. If the first vicinity displays deposited material originating from e.g., the introduction of the ventilation hole, fluorescence intensity will be low in the first vicinity compared to the middle section. The ToF-SIMS signal can be used to confirm absence of deposited material even in glass tubes without residual fluorescence.

In a third aspect, the invention relates to a process for the production of a glass tube for pharmaceutical containers comprising the steps of: providing a glass melt comprising volatile components, such as e.g., borates, preferably melting a batch of raw materials yielding the oxides comprised in the glass melt; forming the glass melt into a glass tube, e.g., by drawing; forming the glass tube into a glass tube with a first end and a second end; forming the first end into a first closed end; introducing a ventilation hole into the glass tube; employing suction during at least part of the introduction step and/or directly after the introduction step; and optionally forming and/or sealing the second end into a second closed end.

The inventors have thus established a process for the production of a glass tube for pharmaceutical containers which allows high-throughput in-process screening via a fluorescence assay.

The process according to the invention provides a glass tube for pharmaceutical containers in which one of the open ends is formed into a closed end and wherein a ventilation hole is introduced into the glass tube and ensures an improvement in the inner surface conditions by means of employing suction during at least part of the introduction step and/or directly after the introduction step. It has been observed that due to the high temperatures needed for the introduction of a ventilation hole into the glass tube, parts of the glass composition may evaporate and subsequently condense on the inner surface of the glass tube, foremost in the vicinity near the closed end. In rare and extreme cases even visible deposits, such as e.g., micron-sized water stains, have been observed. The process according to the invention thus provides an effective counter-measure against deposited material on the inner surface of glass tubes.

DETAILED DESCRIPTION

In a first aspect, the invention relates to a glass tube for pharmaceutical containers, the glass tube having an inner surface and an outer surface, the glass tube having an inner diameter $d_i$ and an outer diameter $d_o$, the glass tube having a first end and a second end, the glass tube having a first location, wherein the first location is at a distance of 400 mm from the first end, the glass tube having a first intermediate location, wherein the first intermediate location is at a distance of 15 mm from the first end, wherein the first end is formed into a first closed end, wherein preferably also the second end is formed into a second closed end, wherein a ventilation hole is located within a first vicinity of the first closed end, wherein the first vicinity is between the first intermediate location and the first location, wherein ToF-SIMS signals are measurable on the inner surface in the first vicinity, including an $Na_2F^+$ signal and an $^{30}Si^+$ signal, wherein an area on the inner surface in the first vicinity, having a ratio of an integrated $Na_2F^+$ signal to an integrated $^{30}Si^+$ signal of at least 0.10, is 36 mm$^2$ or less, wherein the $Na_2F^+$ signal and the $^{30}Si^+$ signal are integrated over a depth of 100 nm.

ToF-SIMS (Time-of-Flight Secondary-Ion-Mass-Spectrometry) is a sensitive means to assess glass surfaces and thereby lends itself to assess the inner surface of glass tubes. The inventors have established conditions and accordingly provided a glass tube for pharmaceutical containers with a ventilation hole, wherein deposited material resulting from manufacturing has been minimised compared to glass tubes known in the art. An integrated $Na_2F^+$ signal to an integrated $^{30}Si^+$ signal serves as a fingerprint and/or an indication of deposited material on the inner glass surface which is characteristic of a glass tube for pharmaceutical containers.

Figure 1A:
FIG. 1A shows a glass tube manufactured according to a process in the art displaying water stains on the inner surface.
Figure 1B:
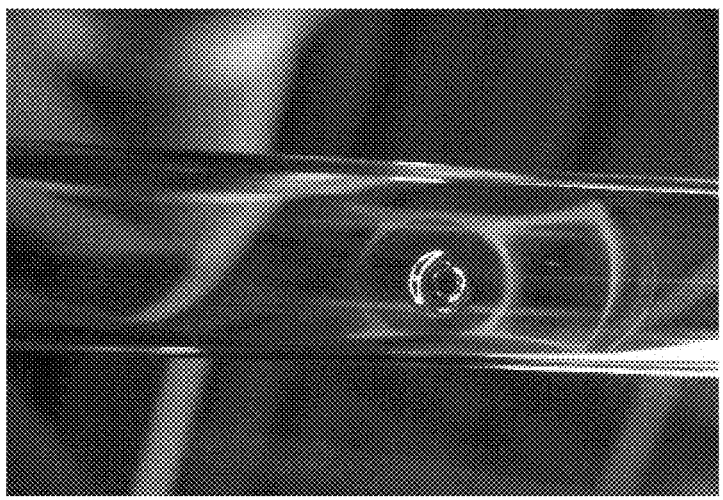
FIG. 1B shows a glass tube manufactured according to a process in the art displaying borates deposited on the inner glass surface
Figure 1C:
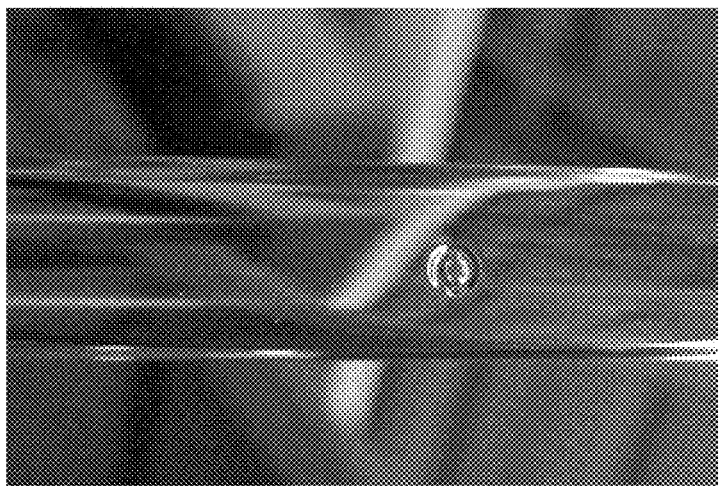
FIG. 1C shows a glass tube manufactured according to a process of the invention.
Figure 2:
FIG. 2 shows three-dimensional ToF-SIMS mapping analyses acquired on affected inner surface regions of the glass tube shown in FIG. 1A. The analysis is based on positive ion species detectable by ToF-SIMS.
Figure 2:
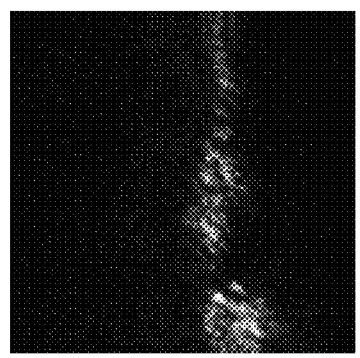
Figure 2:
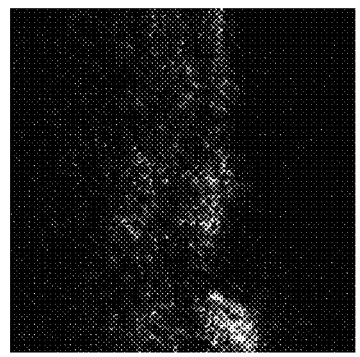
Figure 2:
Figure 3:
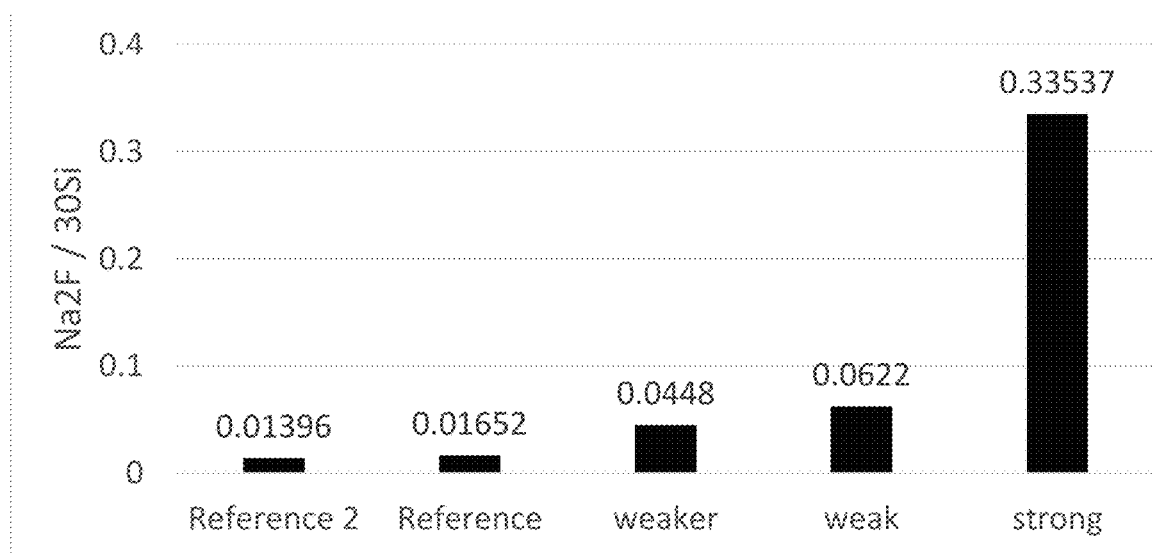
FIG. 3 shows an analysis of ToF-SIMS data obtained from five positions of an inner surface of a glass tube: The data relating to "Reference" and "Reference 2" are devoid of deposited material; the data designated as "weaker" and "weak" display a signal originating from detectable stains; and the data denoted "strong" displays a signal originating from a severe stain. The monitored ToF-SIMS signal is based on a ratio of an integrated $Na_2F^+$ signal to an integrated $^{30}Si^+$ signal, wherein the $Na_2F^+$ signal and the $^{30}Si^+$ signal are integrated over a depth of 100 nm.
Figure 4A:
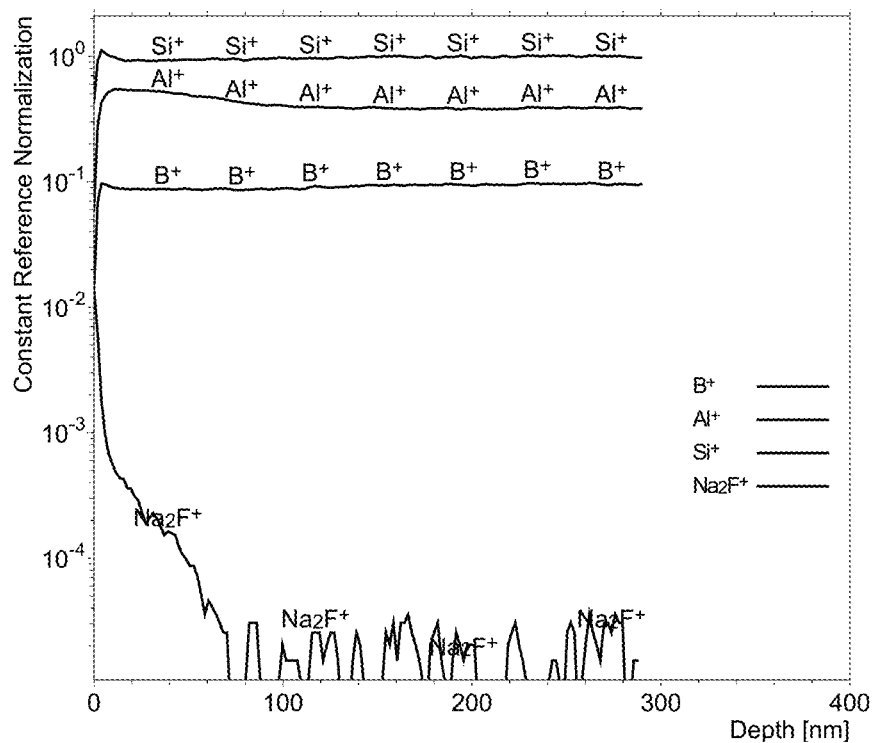
FIGS. 4A-E shows the recording of the underlying ToF-SIMS data over a depth of more than 100 nm using the analysis and sputter parameters given in the Methods section. The recordings relate to the data shown in FIG. 3, wherein FIG. 4A relates to "Reference 2", FIG. 4B to "Reference", FIG. 4C to "weaker", FIG. 4D to "weak" and FIG. 4E to the "strong" signal shown in FIG. 3.
Figure 4B:
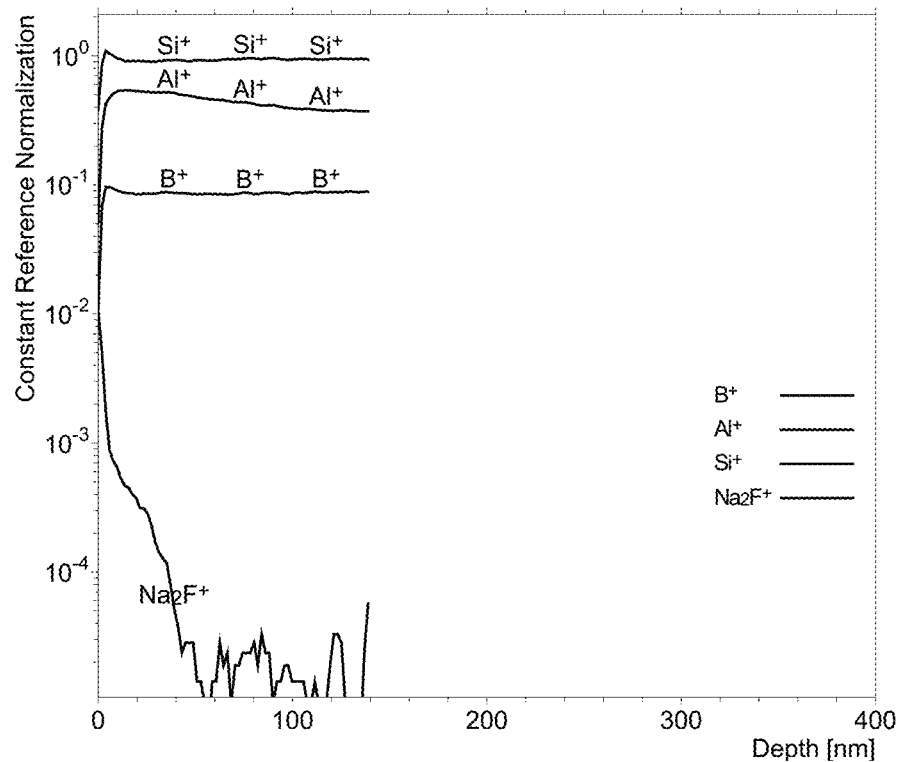
Figure 4C:
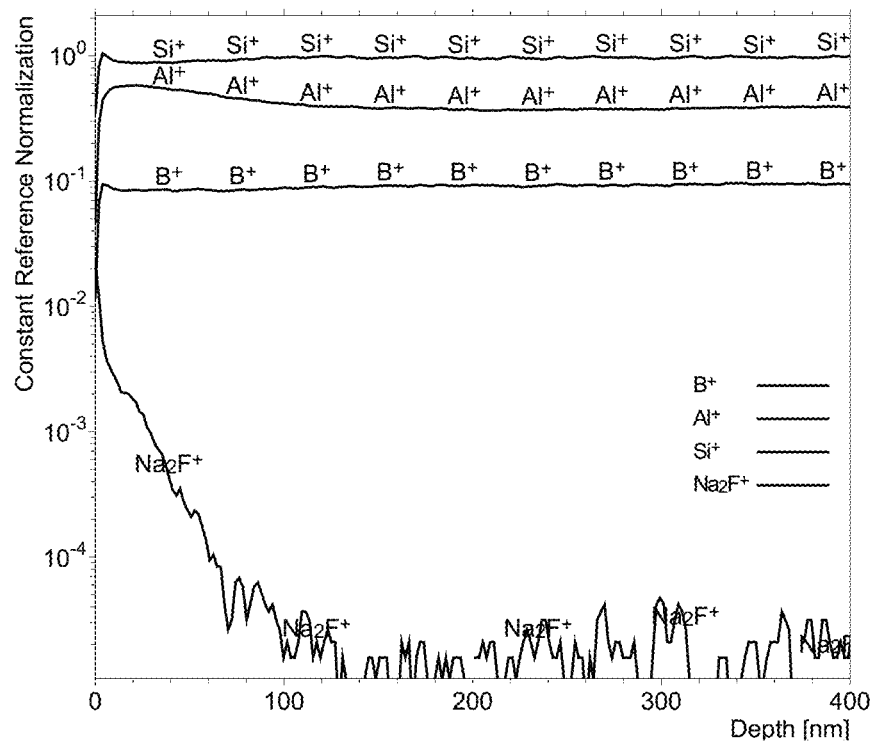
Figure 4D:
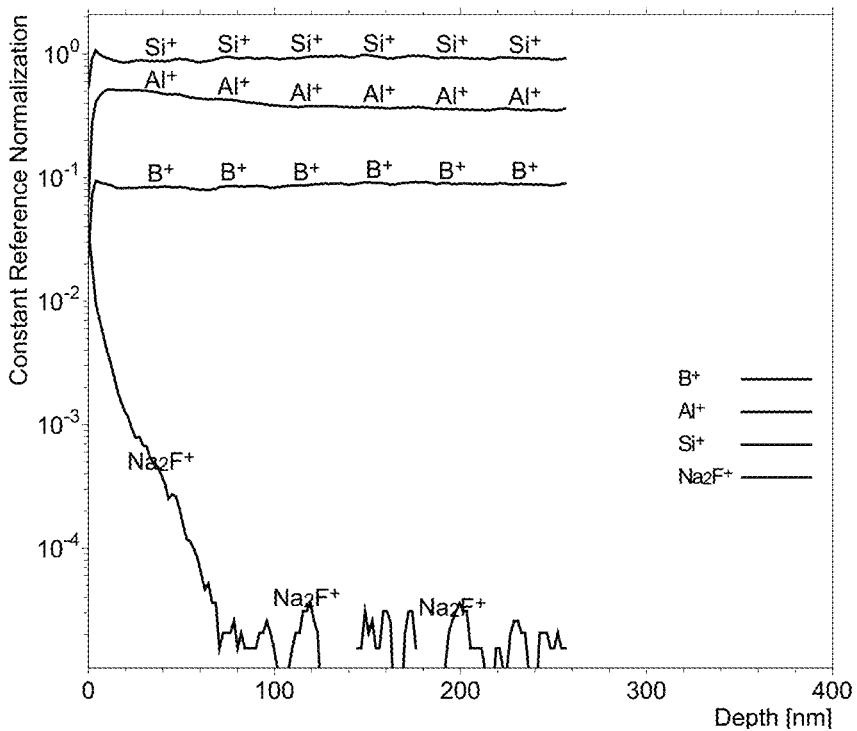
Figure 4E:
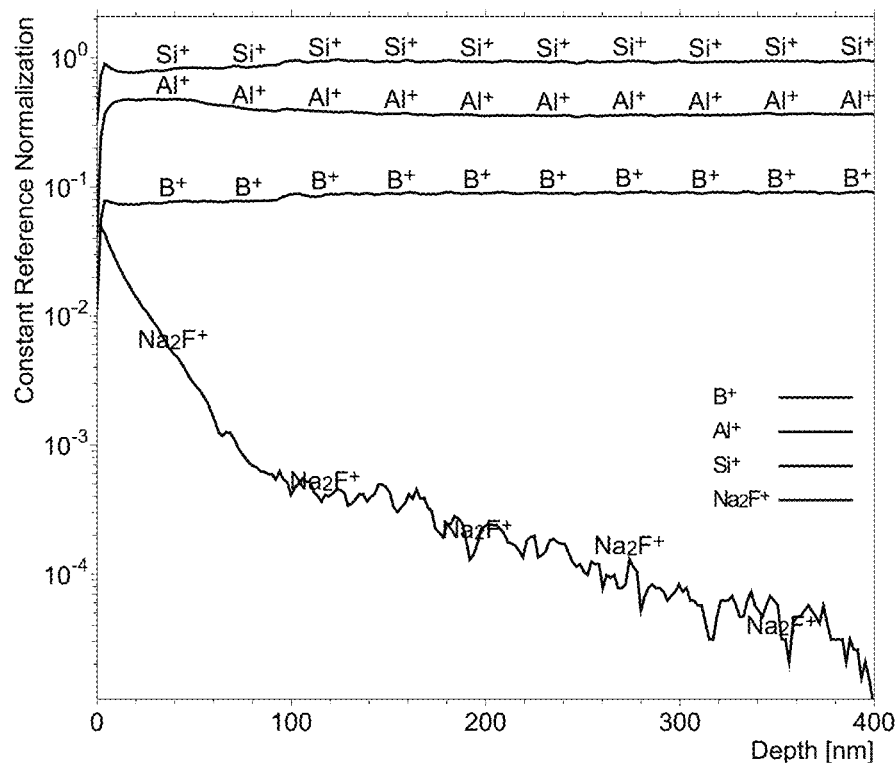

To ensure a rigorous and thorough assessment of the inner surface of the glass tube, the $Na_2F^+$ signal was integrated over a depth of 100 nm and has been normalised to the $^{30}Si$ signal in the same depth range. The $^{30}Si$ isotope has been chosen to avoid detector saturation of the $^{28}Si$ signal. Three-dimensional (3D) ToF-SIMS analysis allows the measurement of maps on an inner glass surface. The area resolution of 3D ToF-SIMS analyses has been estimated to around 4×4 µm, i.e. 16 µm$^2$ (cf. FIG. 2).

In one embodiment of the glass tube, the first vicinity is characterised by a ToF-SIMS signal, wherein an area, having a ratio of an integrated $Na_2F^+$ signal to an integrated $^{30}Si^+$ signal of at least 0.10, wherein the $Na_2F^+$ signal and the $^{30}Si^+$ signal are integrated over a depth of 100 nm, is 36 mm$^2$ or less, 25 mm$^2$ or less, 20 mm$^2$ or less, 16 mm$^2$ or less, 10 mm$^2$ or less, 5 mm$^2$ or less, 3 mm$^2$ or less, or 1 mm$^2$ or less. Advantageously, the glass tube may only display small areas of deposited material above a detection threshold of an integrated $Na_2F^+$ signal to an integrated $^{30}Si^+$ signal of at least 0.10.

In one embodiment of the glass tube, the first vicinity is characterised by a ToF-SIMS signal, wherein an area, having a ratio of an integrated $Na_2F^+$ signal to an integrated $^{30}Si^+$ signal of at least 0.10 and not more than 0.50, wherein the $Na_2F^+$ signal and the $^{30}Si^+$ signal are integrated over a depth of 100 nm, is 36 mm$^2$ or less, 25 mm$^2$ or less, 20 mm$^2$ or less, 16 mm$^2$ or less 10 mm$^2$ or less, 5 mm$^2$ or less, 3 mm$^2$ or less, or 1 mm$^2$ or less. In one embodiment of the glass tube, the first vicinity is characterised by a ToF-SIMS signal, wherein an area, having a ratio of an integrated $Na_2F^+$ signal to an integrated $^{30}Si^+$ signal of at least 0.10 and not more than 0.50, wherein the $Na_2F^+$ signal and the $^{30}Si^+$ signal are integrated over a depth of 100 nm, is between 36 mm$^2$ and 0.0001 mm$^2$, between 10 mm$^2$ and 0.001 mm$^2$, between 3 mm$^2$ and 0.01 mm$^2$, or between 1 mm$^2$ and 0.1 mm$^2$.

In one embodiment of the glass tube, the first vicinity is characterised by a ToF-SIMS signal, wherein an area, having a ratio of an integrated $Na_2F^+$ signal to an integrated $^{30}Si^+$ signal of at least 0.10, wherein the $Na_2F^+$ signal and the $^{30}Si^+$ signal are integrated over a depth of 100 nm, is 0 mm$^2$. In one embodiment of the glass tube, the first vicinity is characterised by a ToF-SIMS signal, wherein an area, having a ratio of an integrated $Na_2F^+$ signal to an integrated $^{30}Si^+$ signal of at least 0.10 and not more than 0.50, wherein the $Na_2F^+$ signal and the $^{30}Si^+$ signal are integrated over a depth of 100 nm, is 0 mm$^2$.

Advantageously, the glass tube may be fully devoid of deposited material above a detection threshold of an integrated $Na_2F^+$ signal to an integrated $^{30}Si^+$ signal of at least 0.10.

In one embodiment, the ToF-SIMS signal is generated using Ge at 25 keV as a primary ion source and at a primary ion current of 1 pA, preferably at a mass resolution $\Delta m/m$ at a mass 65 of >5000, an analysis area of 50×50 µm$^2$, using $O_2^+$ at 1 keV as a sputter ion at a sputter ion current of 300 nA and a sputter area of 300×300 µm$^2$, optionally using an electron floodgun for charge compensation.

In one embodiment, the ToF-SIMS signal is determined by normalising the counts of the detected ion species, such as e.g., $Na_2F^+$, to the counts of $^{30}Si^+$ ions which are, by definition, set to 1, determining the sputter depth by measurement of the crater depth using white-light microscopy, and calculating the quotient between the integrated intensities of $Na_2F^+$ and $^{30}Si^+$ within the outer 100 nm of the inner surface. The quotient between the integrated intensities of $Na_2F^+$ and $^{30}Si^+$ within the outer 100 nm of the inner surface may be expressed as $\Sigma\ Na_2F^+/\Sigma^{30}Si^+$.

In a second aspect, the invention relates to a glass tube for pharmaceutical containers, the glass tube having an inner surface and an outer surface, the glass tube having an inner diameter $d_i$ and an outer diameter $d_o$, the glass tube having a first end and a second end, the glass tube having a first location, wherein the first location is at a distance of 400 mm from the first end, the glass tube having a first intermediate location, wherein the first intermediate location is at a distance of 15 mm from the first end, wherein the first end is formed into a first closed end, wherein preferably also the second end is formed into a second closed end, wherein a ventilation hole is located within a first vicinity of the first closed end, wherein the first vicinity is between the first intermediate location and the first location, the glass tube having a length $l_a$ along its longitudinal axis, the glass tube further having a middle section, wherein the middle section extends to a distance of 5 $d_i$ centred around the position of 0.5 $l_a$ along the longitudinal axis, wherein the glass tube has a ratio between the fluorescence emission determined at the first vicinity and the fluorescence emission determined at the middle section of at least 0.6.

The inventors have established that fluorescent components which are intentionally present in the glass composition, such as e.g., $Fe_2O_3$, $TiO_2$, $ZrO_2$, $CeO_2$, $As_2O_3$, $K_2O$, provide for fluorescence of the obtained glass tube. One of these fluorescing oxide components, for example $ZrO_2$, may stem from the melting tank during the melting of a batch of glass raw materials. The invention provides a glass tube for pharmaceutical containers with a ventilation hole, wherein deposited material on the inner glass surface of the glass tube is minimised and/or avoided compared to glass tubes known in the art, which allows high-throughput in-process screening via a fluorescence assay.

The following phenomenon has been found and has been turned into an industrial application: An excitation light beam can be directed on the outer surface of a glass tube and will be refracted into the glass tube and totally internally reflected at the glass-air interface inside the glass tube. Along its light path inside the glass tube, fluorescent components will be excited whose fluorescence can be detected orthogonally from the excitation beam. In case the inner surface of the glass tube has deposited material by e.g., components resulting from manufacturing, total internal reflection of the excitation light beam will be frustrated which leads to a loss of excitation light at the glass-air interface and/or a reduction excitation light intensity. This loss in excitation light (intensity) directly correlates with a loss in fluorescence emission which is readily detectable by a fluorescence detector. A suitable fluorescence detector can be integrated into the manufacturing apparatus and serves as a direct way of integrated product control.

In one embodiment, fluorescence emission is measured at an excitation wavelength of 290 nm and at an emission wavelength of 370 nm, wherein the slit width for excitation is 10 nm, and wherein the slit width for emission is 10 nm, wherein optionally the integration is 100 ms, wherein the glass tube is positioned in such a way that an angle between an incident excitation light beam and a reflected excitation light beam is around 90°, wherein fluorescence emission is detected at an angle of around 90°.

In one embodiment a glass tube for pharmaceutical containers is provided, the glass tube having an inner surface and an outer surface, the glass tube having an inner diameter $d_i$ and an outer diameter $d_o$, the glass tube having a first end and a second end, the glass tube having a first location, wherein the first location is at a distance of 400 mm from the first end, the glass tube having a first intermediate location, wherein the first intermediate location is at a distance of 15 mm from the first end, wherein the first end is formed into a first closed end, wherein preferably also the second end is formed into a second closed end, wherein a ventilation hole is located within a first vicinity of the first closed end, wherein the first vicinity is between the first first intermediate location and the first location, the glass tube having a length $l_a$ along its longitudinal axis, the glass tube further having a middle section, wherein the middle section extends to a distance of 5 $d_i$ centred around the position of 0.5 $l_a$ along the longitudinal axis, wherein the glass tube has a ratio between the fluorescence emission determined at the first vicinity and the fluorescence emission determined at the middle section of at least 0.6, wherein fluorescence emission is measured at an excitation wavelength of 290 nm and at an emission wavelength of 370 nm, wherein the slit width for excitation is 10 nm, and wherein the slit width for emission is 10 nm, wherein optionally the integration is 100 ms, wherein the glass tube is positioned in such a way that an angle between an incident excitation light beam and a reflected excitation light beam is around 90°, wherein fluorescence emission is detected at an angle of around 90°.

In one embodiment, the glass tube has a ratio between the fluorescence emission determined at the first vicinity and the fluorescence emission determined at the middle section of at least 0.6, at least 0.7, at least 0.8, at least 0.9, or at least 0.95. In one embodiment, the glass tube has a ratio between the fluorescence emission determined at the first vicinity and the fluorescence emission determined at the middle section of 1.0 or less, 0.99 or less, 0.98 or less, 0.97 or less, or 0.96 or less. In one embodiment, the glass tube has a ratio between the fluorescence emission determined at the first vicinity and the fluorescence emission determined at the middle section of 0.6 to 1.0, 0.7 to 0.99, 0.8 to 0.98, 0.9 to 0.97, or 0.95 to 0.96.

Advantageously, the glass tube has an inner surface at the first vicinity which resembles the inner surface of the middle section. In other words, the glass tube may display similar surface properties in both the first vicinity and the middle section reflecting a reduction and/or complete elimination of deposited material which may be found on the inner surface at the first vicinity.

In one embodiment of the glass tube, the inner surface comprises a deposit located in the first vicinity, wherein the deposit has a deposit area extending parallel to the inner surface of the glass tube, wherein the deposit area is 0.01 $mm^2$ to 36 $mm^2$, and wherein the deposit has a ratio of an integrated $Na_2F^+$ signal to an integrated $^{30}Si^+$ signal of 0.0002 to less than 0.10, wherein the $Na_2F^+$ signal and the $^{30}Si^+$ signal are integrated over a depth of 100 nm.

In one embodiment, the deposit located in the first vicinity of the inner surface extends parallel to the inner surface of the glass tube, having a deposit area of 0.01 $mm^2$ to 36 $mm^2$, and is identifiable and/or detectable by a ratio of an integrated $Na_2F^+$ signal to an integrated $^{30}Si^+$ signal of 0.0002 to less than 0.10, wherein the $Na_2F^+$ signal and the $^{30}Si^+$ signal are integrated over a depth of 100 nm.

In one embodiment, a deposit results from condensates and/or sublimates, such as sodium salts, e.g., NaCl and/or NaF, and/or borates, e.g., sodium borate, which may emanate through evaporation from the glass during the introduction of ventilation holes into the glass tube.

In one embodiment of the glass tube, the deposit area is 0.01 $mm^2$ to 1 $mm^2$ and the deposit comprises a ratio of an integrated $Na_2F^+$ signal to an integrated $^{30}Si$ signal of 0.0002 to less than 0.025, or the deposit area is 0.01 $mm^2$ to 36 $mm^2$ and the deposit comprises a ratio of an integrated $Na_2F^+$ signal to an integrated $^{30}Si$ signal of 0.0002 to less than 0.025.

In one embodiment, the deposit area is at least 0.01 $mm^2$, at least 0.03 $mm^2$, at least 0.1 $mm^2$, at least 0.2 $mm^2$, at least 0.3 $mm^2$, or at least 0.5 $mm^2$. In one embodiment, the deposit area is 36 $mm^2$ or less, 25 $mm^2$ or less, 20 $mm^2$ or less, 16 $mm^2$ or less, 10 $mm^2$ or less, 5 $mm^2$ or less, 3 $mm^2$ or less, or 1 $mm^2$ or less. In one embodiment, the deposit area is between 36 $mm^2$ and 0.01 $mm^2$, between 25 $mm^2$ and 0.03 $mm^2$, between 20 $mm^2$ and 0.05 $mm^2$, between 16 $mm^2$ and 0.07 $mm^2$, between 10 $mm^2$ and 0.1 $mm^2$, between 5 $mm^2$ and 0.2 $mm^2$, between 3 $mm^2$ and 0.3 $mm^2$, or between 1 $mm^2$ and 0.5 $mm^2$.

In one embodiment, the deposit comprises a ratio of an integrated $Na_2F^+$ signal to an integrated $^{30}Si$ signal of at least 0.0002, at least 0.0005, at least 0.001, at least 0.002, at least 0.005, or at least 0.01. In one embodiment, the deposit comprises a ratio of an integrated $Na_2F^+$ signal to an integrated $^{30}Si$ signal of 0.2 or less, 0.1 or less, 0.08 or less, 0.06 or less, 0.05 or less, 0.04 or less, or 0.025 or less. In one embodiment, the deposit comprises a ratio of an integrated $Na_2F^+$ signal to an integrated $^{30}Si$ signal of 0.0002 to 0.2, 0.0005 to 0.1, 0.001 to 0.08, 0.002 to 0.06, 0.005 to 0.04, or 0.01 to 0.025.

In one embodiment of the glass tube, the deposit area is 0.01 mm$^2$ to 1 mm$^2$ and the deposit comprises a ratio of an integrated $Na_2F^+$ signal to an integrated $^{30}Si$ signal of 0.0002 to 0.2, 0.0005 to 0.1, 0.001 to 0.08, 0.002 to 0.06, 0.005 to 0.04, or 0.01 to 0.025.

In one embodiment of the glass tube, the deposit comprises a ratio of an integrated $Na_2F^+$ signal to an integrated $^{30}Si$ signal of 0.0002 to less than 0.025, wherein the deposit area is between 36 mm$^2$ and 0.01 mm$^2$, between 25 mm$^2$ and 0.03 mm$^2$, between 20 mm$^2$ and 0.05 mm$^2$, between 16 mm$^2$ and 0.07 mm$^2$, between 10 mm$^2$ and 0.1 mm$^2$, between 5 mm$^2$ and 0.2 mm$^2$, between 3 mm$^2$ and 0.3 mm$^2$, or between 1 mm$^2$ and 0.5 mm$^2$.

In one embodiment of the glass tube, at least 90% of the inner surface of the first vicinity, at least 99%, at least 99.9%, or at least 99.99%, are characterised by a ratio of an integrated $Na_2F^+$ signal to an integrated $^{30}Si$ signal of 0.0002 to less than 0.025, wherein the $Na_2F^+$ signal and the $^{30}Si^+$ signal are integrated over a depth of 100 nm.

In one embodiment of the glass tube, at least 99% of the inner surface of the first vicinity are characterised by a ratio of an integrated $Na_2F^+$ signal to an integrated $^{30}Si$ signal of 0.0002 to 0.2, 0.0005 to 0.1, 0.001 to 0.08, 0.002 to 0.06, 0.005 to 0.04, or 0.01 to 0.025, wherein the $Na_2F^+$ signal and the $^{30}Si^+$ signal are integrated over a depth of 100 nm.

In one embodiment of the glass tube, at least 99.99% of the inner surface of the first vicinity are characterised by a ratio of an integrated $Na_2F^+$ signal to an integrated $^{30}Si$ signal of 0.0002 to 0.2, 0.0005 to 0.1, 0.001 to 0.08, 0.002 to 0.06, 0.005 to 0.04, or 0.01 to 0.025, wherein the $Na_2F^+$ signal and the $^{30}Si^+$ signal are integrated over a depth of 100 nm.

In one embodiment, the glass tube has a "hydrolytic resistance" which is defined as the alkali leachability on the middle section of the inner surface, determined as $Na_2O$ equivalents in an eluate prepared according to ISO 4802-2: 2010, wherein the hydrolytic resistance is less than 0.5 µg cm$^{-2}$, less than 0.4 µg cm$^{-2}$, less than 0.3 µg cm$^{-2}$, less than 0.2 µg cm$^{-2}$, or less than 0.1 µg cm$^{-2}$.

In one embodiment, the glass tube has a hydrolytic resistance of at least 0.01 µg cm$^{-2}$, at least 0.02 µg cm$^{-2}$, at least 0.03 µg cm$^{-2}$, at least 0.04 µg cm$^{-2}$, or at least 0.05 µg cm$^{-2}$.

In one embodiment, the glass tube has a hydrolytic resistance from 0.01 to 0.5 µg cm$^{-2}$, 0.02 to 0.4 µg cm$^2$, 0.03 to 0.3 µg cm$^{-2}$, 0.04 to 0.2 µg cm$^{-2}$, or 0.05 to 0.1 µg cm$^{-2}$.

Glass Composition

In one embodiment of the glass tube for pharmaceutical containers, the glass tube comprises a glass composition selected from the list of soda-lime glass, borosilicate glass, aluminosilicate glass, a glass comprising from 5 to 20 mol % $B_2O_3$, based on all oxides present in the glass composition.

The glass composition may comprise, among others, oxide species which inherently display at least to some fluorescence upon excitation with UV light, i.e. in the range of 100 to 380 nm, e.g., $Fe_2O_3$, $TiO_2$, $ZrO_2$, $CeO_2$, $As_2O_3$ and/or $K_2O$.

In one embodiment of the glass tube for pharmaceutical containers, the glass tube comprises a glass composition comprising 5 to 20 mol % $B_2O_3$ and/or 2 to 10 mol % $Na_2O$. Optionally, the glass composition comprises 60 to 85 mol % $SiO_2$, 5 to 20 mol % $B_2O_3$, 2 to 10 mol % $Al_2O_3$, 0 to 2 mol % $Fe_2O_3$, 2 to 10 mol % $Na_2O$, 0 to 5 mol % $K_2O$, 0 to 2 mol % BaO, 0 to 2 mol % CaO, and/or 0 to 10 mol % $TiO_2$, based on all oxides present in the glass composition.

In one embodiment, the glass composition comprises at least 60 mol % $SiO_2$, at least 62 mol % $SiO_2$, at least 64 mol % $SiO_2$, at least 66 mol % $SiO_2$, or at least 68 mol % $SiO_2$, based on all oxides present in the glass composition. In one embodiment, the glass composition comprises 85 mol % $SiO_2$ or less, 83 mol % $SiO_2$ or less, 81 mol % $SiO_2$ or less, 79 mol % $SiO_2$ or less, or 77 mol % $SiO_2$ or less, based on all oxides present in the glass composition. In one embodiment, the glass composition comprises 60 to 85 mol % $SiO_2$, 62 to 83 mol % $SiO_2$, 64 to 81 mol % $SiO_2$, 66 to 79 mol % $SiO_2$, or 68 to 77 mol % $SiO_2$, based on all oxides present in the glass composition.

In one embodiment, the glass composition comprises at least 5.0 mol % $B_2O_3$, at least 5.5 mol % $B_2O_3$, at least 6.0 mol % $B_2O_3$, at least 6.5 mol % $B_2O_3$, or at least 7.0 mol % $B_2O_3$, based on all oxides present in the glass composition. In one embodiment, the glass composition comprises 20.0 mol % $B_2O_3$ or less, 18.0 mol % $B_2O_3$ or less, 16.0 mol % $B_2O_3$ or less, 14.0 mol % $B_2O_3$ or less, or 12.0 mol % $B_2O_3$ or less, based on all oxides present in the glass composition. In one embodiment, the glass composition comprises 5.0 to 20.0 mol % $B_2O_3$, 5.5 to 18.0 mol % $B_2O_3$, 6.0 to 16.0 mol % $B_2O_3$, 6.5 to 14.0 mol % $B_2O_3$, or 7.0 to 12.0 mol % $B_2O_3$, based on all oxides present in the glass composition.

In one embodiment, the glass composition comprises at least 2.0 mol % $Al_2O_3$, at least 3.0 mol % $Al_2O_3$, at least 4.0 mol % $Al_2O_3$, or at least 5.0 mol % $Al_2O_3$, based on all oxides present in the glass composition. In one embodiment, the glass composition comprises 10.0 mol % $Al_2O_3$ or less, 9.0 mol % $Al_2O_3$ or less, 8.0 mol % $Al_2O_3$ or less, or 7.0 mol % $Al_2O_3$ or less, based on all oxides present in the glass composition. In one embodiment, the glass composition comprises 2.0 to 10.0 mol % $Al_2O_3$, 3.0 to 9.0 mol % $Al_2O_3$, 4.0 to 8.0 mol % $Al_2O_3$, or 5.0 to 7.0 mol % $Al_2O_3$, based on all oxides present in the glass composition.

In one embodiment, the glass composition comprises at least 0 mol % $Fe_2O_3$, at least 0.2 mol % $Fe_2O_3$, or at least 0.5 mol % $Fe_2O_3$, based on all oxides present in the glass composition. In one embodiment, the glass composition comprises 2.0 mol % $Fe_2O_3$ or less, 1.5 mol % $Fe_2O_3$ or less, or 1.2 mol % $Fe_2O_3$ or less, based on all oxides present in the glass composition. In one embodiment, the glass composition comprises 0 to 2.0 mol % $Fe_2O_3$, 0.2 to 1.5 mol % $Fe_2O_3$, or 0.5 to 1.2 mol % $Fe_2O_3$, based on all oxides present in the glass composition.

In one embodiment, the glass composition comprises at least 2 mol % $Na_2O$, at least 4 mol % $Na_2O$, or at least 6 mol % $Na_2O$, based on all oxides present in the glass composition. In one embodiment, the glass composition comprises 10 mol % $Na_2O$ or less, 9 mol % $Na_2O$ or less, or 8 mol % $Na_2O$ or less, based on all oxides present in the glass composition. In one embodiment, the glass composition comprises 2 to 10 mol % $Na_2O$, 4 to 9 mol % $Na_2O$, or 6 to 8 mol % $Na_2O$, based on all oxides present in the glass composition.

In one embodiment, the glass composition comprises at least 0.0 mol % $K_2O$, at least 0.2 mol % $K_2O$, or at least 0.5 mol % $K_2O$, based on all oxides present in the glass composition. In one embodiment, the glass composition comprises 5.0 mol % $K_2O$ or less, 3.5 mol % $K_2O$ or less, 2.5 mol % $K_2O$ or less, 2.0 mol % $K_2O$ or less, or 1.5 mol % $K_2O$ or less, based on all oxides present in the glass composition. In one embodiment, the glass composition comprises 0.0 to 5.0 mol % $K_2O$, 0.2 to 3.5 mol % $K_2O$, or 0.5 to 2.5 mol % $K_2O$, based on all oxides present in the glass composition.

In one embodiment, the glass composition comprises at least 0.0 mol % BaO, at least 0.2 mol % BaO, or at least 0.5 mol % BaO, based on all oxides present in the glass composition. In one embodiment, the glass composition comprises 3.0 mol % BaO or less, 2.5 mol % BaO or less, or 2.0 mol % BaO or less, based on all oxides present in the glass composition. In one embodiment, the glass composition comprises 0.0 to 3.0 mol % BaO, 0.2 to 2.5 mol % BaO, or 0.5 to 2.0 mol % BaO, based on all oxides present in the glass composition.

In one embodiment, the glass composition comprises at least 0.0 mol % CaO, at least 0.2 mol % CaO, or at least 0.5 mol % CaO, based on all oxides present in the glass composition. In one embodiment, the glass composition comprises 3.0 mol % CaO or less, 2.5 mol % CaO or less, or 2.0 mol % CaO or less, based on all oxides present in the glass composition. In one embodiment, the glass composition comprises 0.0 to 3.0 mol % CaO, 0.2 to 2.5 mol % CaO, or 0.5 to 2.0 mol % CaO, based on all oxides present in the glass composition.

In one embodiment, the glass composition comprises at least 0.0 mol % $TiO_2$, at least 1.0 mol % $TiO_2$, at least 2.0 mol % $TiO_2$, at least 3.0 mol % $TiO_2$, or at least 4.0 mol % $TiO_2$, based on all oxides present in the glass composition. In one embodiment, the glass composition comprises 10.0 mol % $TiO_2$ or less, 9.0 mol % $TiO_2$ or less, 8.0 mol % $TiO_2$ or less, 7.0 mol % $TiO_2$ or less, or 6.0 mol % $TiO_2$ or less, based on all oxides present in the glass composition. In one embodiment, the glass composition comprises 0.0 to 10.0 mol % $TiO_2$, 1.0 to 9.0 mol % $TiO_2$, 2.0 to 8.0 mol % $TiO_2$, 3.0 to 7.0 mol % $TiO_2$, or 4.0 to 6.0 mol % $TiO_2$, based on all oxides present in the glass composition.

In one embodiment of the glass tube for pharmaceutical containers, the glass tube comprises a glass composition, wherein the glass composition comprises one or more fining agents, e.g., a fining agent selected from the list of arsenic oxide, antimony oxide, tin oxide, cerium oxide, chlorides, sulfates and combinations thereof.

It is advantageous to use a fining agent in the glass composition to allow for bubble formation and bubble escape from the glass melt during the production process of the glass tube for pharmaceutical containers.

In one embodiment of the glass tube for pharmaceutical containers, the glass composition comprises a fining agent selected from the list of arsenic oxide, antimony oxide, and tin oxide.

In one embodiment of the glass tube for pharmaceutical containers, the glass composition comprises a fining agent selected from the list of chlorides, sulfates and combinations thereof.

In one embodiment, the glass composition has a viscosity of $10^2$ dPas at a temperature above 1580° C.

Glass Tube Dimensions and Set of Glass Tubes

In one embodiment, the glass tube has an inner diameter from 5.0 to 49.0 mm, preferably 9.0 to 26 mm, and/or an outer diameter from 6.0 to 50 mm, preferably 8.0 to 30 mm, and/or a glass wall thickness of 0.5 to 2.0 mm, preferably 0.6 to 1.5 mm, and/or a length from 1100 to 5000 mm, preferably 1500 to 2000 mm.

In one embodiment of the glass tube for pharmaceutical containers, the glass tube has an inner diameter from 5.0 to 49.0 mm, 6.0 to 45.0 mm, 7.0 to 40.0 mm, 8.0 to 35.0 mm, or 9.0 to 26 mm.

In one embodiment of the glass tube for pharmaceutical containers, the glass tube has an outer diameter from 6.0 to 50 mm, 7.0 to 40 mm, or 8.0 to 30 mm.

In one embodiment of the glass tube for pharmaceutical containers, the glass tube has a glass wall thickness of 0.5 to 2.0 mm, 0.6 to 1.5 mm, 0.7 to 1.3 mm, or 0.8 to 1.2 mm.

In one embodiment of the glass tube for pharmaceutical containers, the glass tube has a length from 1100 to 5000 mm, 1200 to 3000 mm, or 1500 to 2000 mm.

In one embodiment a set is provided comprising at least 50 glass tubes, at least 100 glass tubes, or at least 200 glass tubes. In one embodiment a set is provided comprising 1000 glass tubes or less, 700 glass tubes or less, or 500 glass tubes or less.

Process for the Production of a Glass Tube

In a third aspect, the invention relates to a process for the production of a glass tube for pharmaceutical containers comprising the steps of providing a glass melt comprising volatile components, such as e.g., borates, preferably melting a batch of raw materials yielding the oxides comprised in the glass melt; forming the glass melt into a glass tube, e.g., by drawing; forming the glass tube into a glass tube with a first end and a second end; forming the first end into a first closed end; introducing a ventilation hole into the glass tube; employing suction during at least part of the introduction step and/or directly after the introduction step; and optionally forming and/or sealing the second end into a second closed end.

The inventors have thus established a process for the production of a glass tube for pharmaceutical containers which avoids the problems known in the art and thereby provides a glass tube which is devoid of or at least minimises deposited material which may be observed on the inner surface.

The process according to the invention provides a glass tube for pharmaceutical containers in which one of the open ends is formed into a closed end and wherein a ventilation hole is introduced into the glass tube and ensures an improvement in the inner surface conditions by means of employing suction during at least part of the introduction step and/or directly after the introduction step. It has been observed that during the high temperatures needed for the introduction of a ventilation hole into the glass tube parts of the glass composition may evaporate and subsequently condense on the inner surface of the glass tube, foremost in the vicinity near the closed end. In rare and extreme cases even visible deposits, such as e.g., micron-sized water stains, have been observed. The process according to the invention thus provides an effective counter-measure against deterioration of glass tubes during their manufacture into glass vials, glass ampoules, glass cartridges or glass syringes, and concomitantly ensures high-quality glass tubes by withdrawing any unwanted chemicals, species as part of the process.

In one embodiment of the process, the glass tube has an inner surface and an outer surface, an inner diameter $d_i$ and an outer diameter $d_o$, a length $l_a$ along its longitudinal axis, a first end and a second end, a first location, wherein the first location is at a distance of 400 mm from the first end, the glass tube having a first intermediate location, wherein the first intermediate location is at a distance of 15 mm from the first end, wherein a first vicinity is defined as the inner surface of the glass tube between the first intermediate location and the first location, wherein the introduction of the ventilation hole into the glass tube is in the first vicinity of the glass tube.

The placement or introduction of the ventilation hole in the first vicinity of the glass tube has a number of practical benefits in the final product. For example, the part of the glass tube with the ventilation hole can be easily removed by cutting or burning without substantial loss of glass material. During the process for the production of a glass tube the introduction of the ventilation hole in or near the first vicinity is advantageous also from a machine design. That is to say, the machine part providing for suction does not need to be introduced very deeply into the glass tube.

In one embodiment of the process, the employment of suction during the introduction step is accompanied by heating of the glass tube in the first vicinity of the glass tube to a temperature of at least 100° C., at least 150° C., or at least 200° C. In one embodiment of the process, the employment of suction during the introduction step is accompanied by heating of the glass tube in the first vicinity of the glass tube to a temperature of 400° C. or less, 350° C. or less, or 300° C. or less. In one embodiment of the process, the employment of suction during the introduction step is accompanied by heating of the glass tube in the first vicinity of the glass tube to a temperature of 100° C. to 400° C., 150° C. to 350° C., or 200° C. to 300° C.

Advantageously, heating the glass tube in the first vicinity in combination with the employment of suction provides for an efficient removal of those species that tend to condensate and/or sublimate, such as sodium salts, e.g., NaCl and/or NaF, and/or borates, e.g., sodium borate, which may emanate through evaporation from the glass during the introduction of ventilation holes into the glass tube.

In one embodiment of the process, the employment of suction under stationary conditions effects an average air flow rate of 5 to 50 m s$^{-1}$, preferably 15 to 25 m s$^{-1}$ inside the glass tube. Advantageously, a suitable air flow rate may additionally benefit the efficient removal of those species that tend to condensate and/or sublimate, such as sodium salts, e.g., NaCl and/or NaF, and/or borates, e.g., sodium borate, which may emanate through evaporation from the glass during the introduction of ventilation holes into the glass tube.

The skilled artisan appreciates that sodium salts, e.g., NaCl and/or NaF, and/or borates, e.g., sodium borate, are typical components of glasses for pharmaceutical containers whose chemical properties bring about sublimation and/or condensation effects during the high temperatures employed for the production of glass tubes, in particular during the introduction of a ventilation hole.

In one embodiment of the process, the introduction of the ventilation hole starts at time point $t_0$ and ends at time point $t_2$, and wherein the employment of suction starts at time point $t_1$ and ends at time point $t_3$, wherein $t_1$ is between $t_0$ and $t_2$, and wherein $t_3$ is after $t_2$.

Advantageously, the timing between the introduction of the ventilation hole and the employment of suction is optimised in such a way which allows and provides for an efficient removal of those species that tend to condensate and/or sublimate, such as sodium salts, e.g., NaCl and/or NaF, and/or borates, e.g., sodium borate, at a time window when they may typically emanate through evaporation from the glass during the process.

Examples and Methods

Fluorescence spectroscopy: A fluorescence spectrometer FLUOROLOG 3 of Horiba (PE-4-0503) was used.

Samples were placed and measured in a 45° geometry, providing for a right angle between excitation and emission beam. Samples were placed in a sample chamber in such a way that the UV light beam enters the glass tube and is reflected inside the wall of the glass tube by way of total internal reflection. Upon passing through the glass wall, UV light excites fluorescent species present in the glass composition, such as $Fe_2O_3$, $TiO_2$, $ZrO_2$, $CeO_2$, $As_2O_3$, $K_2O$, whose emission is detected in a right angle with respect to the excitation beam. In case the glass tube shows deviations on the inner surface, such as e.g., deposits, physical changes affecting the surface roughness, or precipitation of volatile components (such as borates and halogenides), total internal reflection is frustrated which leads to an at least partial loss of excitation light. This loss in excitation light intensity effects a lower fluorescence emission, which thereby serves as a sensitive read-out for any deviations or inhomogeneities on the inner surface of the glass tube.

The following spectrometer settings were employed: a lit width for excitation and emission of 10 nm, integration time for steady state measurements of 0.1 s, and a wavelength sampling of 1 nm. The measurement uncertainty (k=2) of the assay has been estimated to +/−2.0% for the fluorescence intensity and +/−1 nm for the wavelength.

The samples were first subjected to an assessment under a 254 nm excitation lamp to visually judge the fluorescence and homogeneity, and to look for areas that appear inhomogeneous which were identified and prepared for the test. Fluorescence emission of six samples was determined to measure the glass-inherent fluorescence.

Figure 5A:
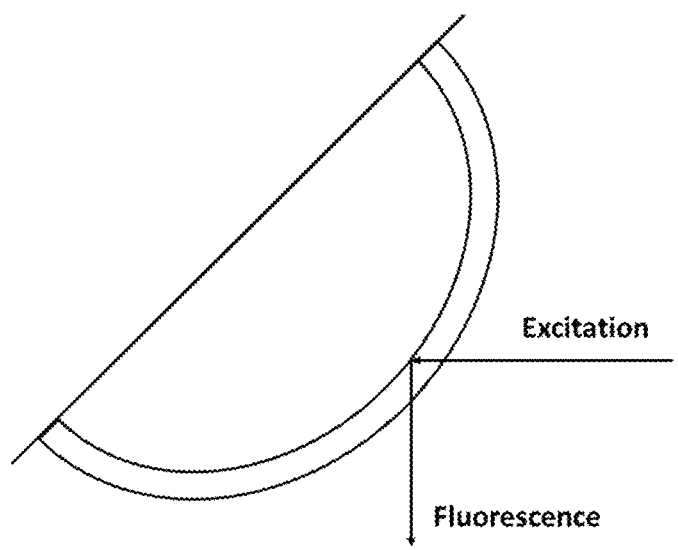
FIG. 5A shows the principle of the high-throughput fluorescence assay for monitoring the quality of the glass tubes. Excitation light from a xenon lamp was spectrally filtered by a monochromator and shone on a glass tube to allow penetration into the glass wall. Inside the glass wall, the excitation light beam is totally internally reflected. Fluorescence emission is collected in a right angle from the excitation light beam and spectrally filtered by a monochromator.
Figure 5B:
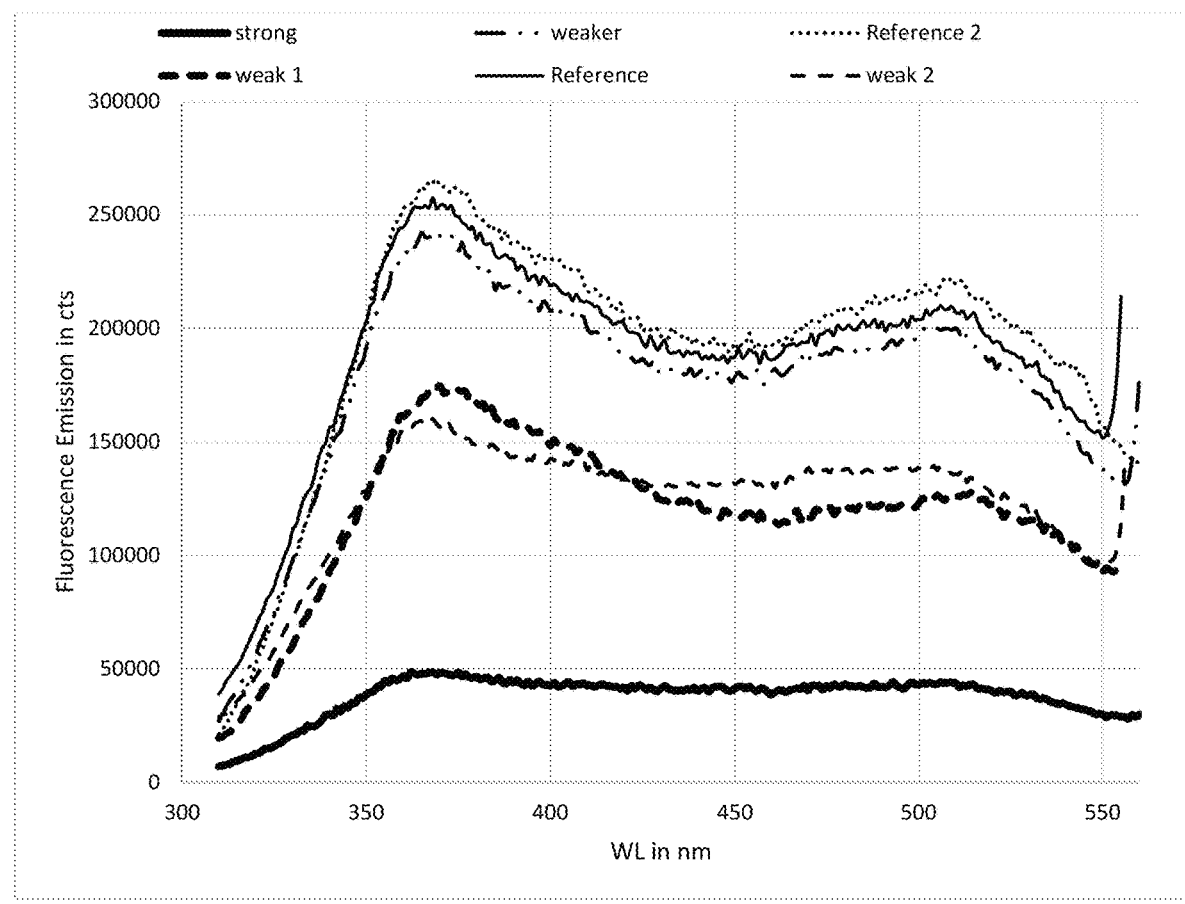
FIG. 5B shows the fluorescence spectra acquired from six positions of an inner surface of a glass tube. Reference positions 1 and 2 are devoid of deposited material, such as e.g., water stains on the inner surface, and display the highest fluorescence intensity. In comparison, glass tubes having deposited material, in agreement with the ToF-SIMS data in FIGS. 3 and 4A to E and classified as 'weak 1', 'weak 2' and 'strong', display significantly reduced fluorescence emission.

An excitation wavelength of 290 nm was used which has proven to provide an efficient excitation for the glass compositions used as part of the invention (FIG. 5B). Differences between the measured intensities between individual samples are larger than the relative measurement uncertainty of +/−3% during the initial fluorescence measurements.

ToF-SIMS (Time-of-Flight Secondary-Ion-Mass-Spectrometry): The ToF-SIMS technique is based on the erosion of a surface by a sputter ion-beam. The secondary ions produced by the primary ion beam are extracted from the surface and detected by mass separation. The generated depth profiles provide information on the qualitative surface composition for different ion species.

A TOF-SIMS IV (ION-TOF GmbH) instrument was employed, using $Ga^+$ at 25 keV as primary ion at a primary ion current of 1 pA, at a mass resolution $\Delta m/m$ at mass 65: >5000, an analysis area of 50×50 $\mu m^2$, and using $O_2^+$ at 1 keV as a sputter ion and at a sputter ion current of 300 nA, a sputter area of 300×300 $\mu m^2$, and employing an electron floodgun for charge compensation.

For the data evaluation all counts of ions were normalized to the $^{30}Si^+$ ions which are, by definition, set to 1.

The sputter depth was determined by subsequent measurement of the crater depth using white-light microscopy. The quotient between integrated intensities of $Na_2F^+$ and $^{30}Si^+$ was calculated within the outer 100 nm layer of the surface, being $\Sigma\ Na_2F^+/\Sigma\ ^{30}Si+$.

ToF-SIMS data were acquired and interpreted applying the standards ASTM E 1829-14 (2014; Standard Guide for Handling Specimens Prior to Surface Analysis) and ASTM E 2695-09 (2009; Standard Guide for Interpretation of Mass Spectral Data Acquired with Time-of-Flight Secondary Ion Mass Spectroscopy). Specifically, the samples were handled in a way to keep them clean and to avoid the introduction of contaminations. The sampled glass tubes were opened and cracked, glass splinters were removed by blowing air/$N_2$ before data acquisition.

Hydrolytic Resistance

The hydrolytic resistance is defined as the alkali leachability on the middle section of the inner surface. The alkali leachability on the inner surface is determined as $Na_2O$ equivalents in an eluate prepared according to ISO 4802-2:2010. This measured parameter is then related to the inner surface that has been in contact with the eluate during the ISO 4802-2:2010 method.

To perform the test glass tubes are cut in respective segments, representing the middle section, each segment having a length of at least 25 mm, while alternatively also lengths of 50 mm and 60 mm are possible.

Referring to point 8.3 of ISO 4802-2:2010, each glass tube segment is capped from one open end, by definition referred to as the bottom end, with a silicone rubber plug. After filling with test water, the glass tube segment is capped at the other open end with aluminium foil. Before their first use, the silicone rubber plugs are cleaned, and the lack of alkali leachability from the silicone rubber plugs is confirmed. After each use the silicone rubber plugs are cleaned. The filling volume with distilled water is determined according to point 7.2.1 or point 7.2.2 of ISO 4802-2:2010 depending on the inner (or bore) diameter of the glass tube segment, i.e. $d_i \leq 20$ mm or $d_i > 20$ mm, respectively.

What is claimed is:

1. A glass tube for pharmaceutical containers, comprising:
an inner surface at an inner diameter and an outer surface with an outer diameter;
a first end defining a first closed end;
a second end defining a second closed end;
a first location 400 mm from the first end;
a first intermediate location 15 mm from the first end; and
a ventilation hole at a first vicinity, the first vicinity being between the first intermediate location and the first location,
wherein the inner surface in the first vicinity has measurable first ToF-SIMS signals, the first ToF-SIMS signals including an $Na_2F^+$ signal and an $^{30}Si^+$ signal,
wherein the inner surface has an area in the first vicinity that is 36 mm² or less,
wherein the first vicinity has a ratio of an integrated $Na_2F^+$ signal to an integrated $^{30}Si^+$ signal of at least 0.10, and
wherein the integrated $Na_2F^+$ signal and the integrated $^{30}Si^+$ signal are integrated over a depth of 100 nm.

2. The glass tube of claim 1, wherein the area is 16 mm² or less.

3. The glass tube of claim 1, wherein the area is 1 mm² or less.

4. The glass tube of claim 1, wherein the inner surface comprises a deposit located in the first vicinity, wherein the deposit has a deposit area extending parallel to the inner surface of the glass tube, the deposit area is 0.01 mm² to 36 mm².

5. The glass tube of claim 1, further comprising a hydrolytic resistance of less than 0.5 µg cm⁻².

6. The glass tube of claim 1, comprising a glass composition selected from a group consisting of soda-lime glass, borosilicate glass, aluminosilicate glass, glass comprising from 5 mol % to 20 mol % $B_2O_3$ based on all oxides present, and glass comprising 60 to 85 mol % $SiO_2$, 5 to 20 mol % $B_2O_3$, 2 to 10 mol % $Al_2O_3$, 0 to 2 mol % $Fe_2O_3$, 2 to 10 mol % $Na_2O$, 0 to 5 mol % $K_2O$, 0 to 2 mol % $BaO$, 0 to 2 mol % $CaO$, 0 to 10 mol % $TiO_2$, based on all oxides present.

7. The glass tube of claim 1, comprising a feature selected from a group consisting of: the inner diameter being from 5.0 to 49.0 mm, the inner diameter being 9.0 to 26 mm, the outer diameter being from 6.0 to 50 mm, the outer diameter being from 8.0 to 30 mm, a thickness from the inner and outer diameters from 0.5 to 2.0 mm, thickness from the inner and outer diameters from 0.6 to 1.5 mm, the length being from 1100 to 5000 mm, the length being from 1200 to 3000 mm, the length being from 1500 to 2000 mm, and combinations thereof.

8. A set of glass tubes comprising at least 50 of the glass tubes of claim 1.

9. A glass tube for pharmaceutical containers, comprising:
an inner surface at an inner diameter and an outer surface with an outer diameter;
a first end defining a first closed end;
a second end defining a second closed end;
a first location 400 mm from the first end;
a first intermediate location 15 mm from the first end; and
a ventilation hole at a first vicinity, the first vicinity being between the first intermediate location and the first location,
a length along a longitudinal axis between the first and second ends;
a middle section extending a distance of 5 times the inner diameters and centred around a position ½ of the longitudinal axis; and
a ratio between a fluorescence emission determined at the first vicinity and a fluorescence emission determined at the middle section of at least 0.6.

10. The glass tube of claim 9, wherein the inner surface comprises a deposit located in the first vicinity, wherein the deposit has a deposit area extending parallel to the inner surface of the glass tube, the deposit area is 0.01 mm² to 36 mm² and has ToF-SIMS signals measurable on the inner surface in the first vicinity, the ToF-SIMS signals including an $Na_2F^+$ signal and an $^{30}Si^+$ signal, wherein the first vicinity has a ratio of an integrated $Na_2F^+$ signal to an integrated $^{30}Si^+$ signal of 0.0002 to less than 0.10, wherein the $Na_2F^+$ signal and the $^{30}Si^+$ signal are integrated over a depth of 100 nm.

11. The glass tube of claim 10, wherein the ratio is less than 0.025.

12. The glass tube of claim 10, wherein the ratio of at least 90% of the inner surface of the first vicinity is less than 0.025.

13. The glass tube of claim 10, wherein the ratio of at least 99% of the inner surface of the first vicinity is less than 0.025.

14. The glass tube of claim 10, wherein the deposit area is 0.01 mm² to 1 mm².

15. The glass tube of claim 9, further comprising a hydrolytic resistance of less than 0.5 µg cm⁻².

16. The glass tube of claim 9, further comprising a hydrolytic resistance of less than 0.1 µg cm⁻².

17. The glass tube of claim 9, comprising a glass composition selected from a group consisting of soda-lime glass, borosilicate glass, aluminosilicate glass, glass comprising from 5 mol % to 20 mol % $B_2O_3$ based on all oxides present, and glass comprising 60 to 85 mol % $SiO_2$, 5 to 20 mol % $B_2O_3$, 2 to 10 mol % $Al_2O_3$, 0 to 2 mol % $Fe_2O_3$, 2 to 10 mol % $Na_2O$, 0 to 5 mol % $K_2O$, 0 to 2 mol % $BaO$, 0 to 2 mol % $CaO$, 0 to 10 mol % $TiO_2$, based on all oxides present.

18. The glass tube of claim 9, comprising a feature selected from a group consisting of: the inner diameter being from 5.0 to 49.0 mm, the inner diameter being 9.0 to 26 mm, the outer diameter being from 6.0 to 50 mm, the outer diameter being from 8.0 to 30 mm, a thickness from the inner and outer diameters from 0.5 to 2.0 mm, thickness from the inner and outer diameters from 0.6 to 1.5 mm, the length being from 1100 to 5000 mm, the length being from 1200 to 3000 mm, the length being from 1500 to 2000 mm, and combinations thereof.

19. A set of glass tubes comprising at least 50 of the glass tubes of claim 9.

20. A set of glass tubes comprising at least 100 of the glass tubes of claim 9.

* * * * *